(12) United States Patent  (10) Patent No.: US 8,527,891 B2
Ma et al.                       (45) Date of Patent:     Sep. 3, 2013

(54) ENABLING USER INTERACTIONS BETWEEN USER INTERFACE COMPONENTS

(75) Inventors: Robert C. Ma, Research Triangle Park, NC (US); Grant D Taylor, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 12/856,438

(22) Filed: Aug. 13, 2010

(65) Prior Publication Data

US 2012/0042271 A1    Feb. 16, 2012

(51) Int. Cl.
*G06F 3/048* (2006.01)
*G06F 3/00* (2006.01)

(52) U.S. Cl.
USPC .......................................... 715/768; 715/746

(58) Field of Classification Search
USPC .................................................. 715/768, 746
See application file for complete search history.

(56) References Cited

U.S. PATENT DOCUMENTS

| | | | |
|---|---|---|---|
| 6,628,309 B1 | 9/2003 | Dodson et al. | |
| 7,665,028 B2 * | 2/2010 | Cummins et al. | 715/769 |
| 7,752,566 B1 * | 7/2010 | Nelson | 715/769 |
| 8,239,781 B2 * | 8/2012 | Taylor | 715/769 |
| 2008/0120129 A1 * | 5/2008 | Seubert et al. | 705/1 |
| 2008/0126966 A1 | 5/2008 | Grossman | |
| 2008/0298342 A1 | 12/2008 | Appleton et al. | |
| 2009/0210811 A1 | 8/2009 | Saul et al. | |
| 2011/0273309 A1 * | 11/2011 | Zhang et al. | 340/870.07 |
| 2012/0042271 A1 * | 2/2012 | Ma et al. | 715/768 |
| 2012/0084694 A1 * | 4/2012 | Sirpal et al. | 715/769 |

OTHER PUBLICATIONS

Chapter 23, "Drag and Drop, and the Clipboard", Dec. 6, 2009. [found at http://p2p.wrox.com/content/sites/default/files/users/21/file/499832_c23_p3.pdf and retrieved Jun. 21, 2010].
Robert Mohns, "VMware Fusion", MacInTouch Special Reports, Aug. 6, 2007. [found at http://macintouch.com/reviews/vmware.html and retrieved Jun. 21, 2010].
Art Manion, "Vulnerability Note VU#413886: Microsoft Internet Explorer allows mouse events to manipulate window objects and perform "drag and drop" operations", copyright 2004 Carnegie Mellon University. [found at http://www.kb.cert.org/vuls/id/413886 and retrieved Jun. 21, 2010].
Adobe Flex 3.5 Language Reference, "NativeDragManager", [found at http://livedocs.adobe.com/flex/3/langref/flash/desktop/NativeDragManager.html and retrieved Jun. 21, 2010].
MelanderBlog, "The Drag and Drop Component Suite for Delphi" [found at http://melander.dk/delphi/dragdrop/ and retrieved Jun. 21, 2010].

* cited by examiner

*Primary Examiner* — David Phantana Angkool
(74) *Attorney, Agent, or Firm* — Kunzler Law Group, PC

(57) ABSTRACT

An apparatus, method, and computer program product are disclosed for enabling user interactions between user interface components. An initial event module detects an initial user input event to a graphical user interface. The initial user input event is associated with a user interaction between a source user interface component and a target user interface component that occupy separate event domains. A transparent component module places a transparent user interface component over the target user interface component in response to the initial user input event. The transparent user interface component occupies the same event domain as the source user interface component. An interaction event module detects an interaction user input event to the transparent user interface component that continues the user interaction. An interaction communication module communicates information of the user interaction to the target user interface component using a communications channel supported by the target user interface component.

25 Claims, 7 Drawing Sheets

ENABLING USER INTERACTIONS BETWEEN USER INTERFACE COMPONENTS

FIELD

The subject matter disclosed herein relates to user interface components and more particularly relates to user interactions between user interface components.

BACKGROUND

Description of the Related Art

Many different frameworks exist for providing user interfaces to computer users. Often, several different user interface frameworks exist on a single computer, within the same operating system. Different user interface frameworks can each simultaneously present shells or windows to a user on the same desktop or screen.

Different user interface frameworks typically do not allow user interactions between them. Similarly, even different software applications using the same user interface framework may not support user interactions between the different software applications, or may not implement each possible type of user interaction supported by a user interface framework. Even a single software application may use multiple user interface frameworks simultaneously, making seamless user interaction between parts of the single software application difficult.

BRIEF SUMMARY

From the foregoing discussion, it should be apparent that a need exists for an apparatus, method, and computer program product that enable user interactions between user interface components. Beneficially, such an apparatus, method, and computer program product would provide a seamless interface for a user to interact between different user interface components.

The present invention has been developed in response to the present state of the art, and in particular, in response to the problems and needs in the art that have not yet been fully solved by currently available user interfaces. Accordingly, the present invention has been developed to provide an apparatus, method, and computer program product for enabling user interactions that overcome many or all of the above-discussed shortcomings in the art.

The apparatus to enable user interactions is provided with a plurality of modules configured to functionally execute the necessary steps of enabling user interactions between user interface components. These modules in the described embodiments include an initial event module, a transparent component module, an interaction event module, and an interaction communication module.

In one embodiment, the initial event module detects an initial user input event to a graphical user interface ("GUI"). The initial user input event, in a further embodiment, is associated with a user interaction between a source user interface component and a target user interface component. The source user interface component and the target user interface component, in another embodiment, are displayed in the GUI. The source user interface component and the target user interface component, in one embodiment, occupy separate event domains.

In one embodiment, the transparent component module places a transparent user interface component over the target user interface component in response to the initial user input event. The transparent user interface component, in a further embodiment, occupies the same event domain as the source user interface component.

In one embodiment, the interaction event module detects an interaction user input event to the transparent user interface component. The interaction user input event, in one embodiment, continues the user interaction between the source user interface component and the target user interface component.

In one embodiment, the interaction communication module communicates information of the user interaction to the target user interface component. The interaction communication module, in a further embodiment, communicates the information of the user interaction using a communications channel supported by the target user interface.

A method of the present invention is also presented for enabling user interactions between user interface components. The method in the disclosed embodiments substantially includes the steps necessary to carry out the functions presented above with respect to the operation of the described apparatus.

In one embodiment, the method includes detecting an initial user input event to a GUI. The initial user input event, in a further embodiment, is associated with a user interaction between a source user interface component and a target user interface component. The source user interface component and the target user interface component, in another embodiment, are displayed in the GUI. In an additional embodiment, the source user interface component and the target user interface component occupy separate event domains.

The method, in one embodiment, includes placing a transparent user interface component over the target user interface component in response to the initial user input event. The transparent user interface component, in another embodiment, occupies the same event domain as the source user interface component.

In a further embodiment, the method includes detecting an interaction user input event to the transparent user interface component. The interaction user input event, in one embodiment, continues the user interaction between the source user interface component and the target user interface component. The method, in another embodiment, includes communicating information of the user interaction to the target user interface component using a communications channel supported by the target user interface.

A computer program product of the present invention is also presented. The computer program product includes a computer readable storage medium with computer readable program code that is executable to perform operations for enabling user interactions between user interface components. In one embodiment, the operations include detecting an initial user input event to a GUI. The initial user input event, in a further embodiment, is associated with a user interaction between a source user interface component and a target user interface component. The source user interface component and the target user interface component, in another embodiment, are displayed in the GUI. In an additional embodiment, the source user interface component and the target user interface component occupy separate event domains.

The operations, in another embodiment, include placing a transparent user interface component over the target user interface component in response to the initial user input event. The transparent user interface component, in another embodiment, occupies the same event domain as the source user interface component. In an additional embodiment, the operations include detecting an interaction user input event to the transparent user interface component. The interaction user input event, in one embodiment, continues the user interaction between the source user interface component and the target user interface component. The operations, in a further embodiment, include communicating information of the user interaction to the target user interface component using a communications channel supported by the target user interface.

An additional apparatus to enable user interactions is provided with a plurality of modules configured to functionally execute the necessary steps described above with regard to the apparatus, method, and computer program product. These modules in the described embodiments include an initial event module, a transparent component module, an interaction event module, a removal module, a translation module, and an interaction communication module.

In one embodiment, the initial event module detects an initial user input event to a GUI. The initial user input event, in a further embodiment, is associated with a user interaction between a source software application shell and a target software application shell. The source software application shell and the target software application shell, in another embodiment, are displayed in the GUI. The source software application shell and the target software application shell, in one embodiment, occupy separate event domains.

In one embodiment, the transparent component module places an invisible software application shell over the target software application shell in response to the initial user input event. The invisible software application shell, in a further embodiment, occupies the same event domain as the source software application shell. In one embodiment, the interaction event module detects an interaction user input event to the transparent software application shell. The interaction user input event, in one embodiment, continues the user interaction between the source software application shell and the target software application shell.

In one embodiment, the removal module removes the invisible software application shell from the target software application shell in response to the interaction user input event. The translation module, in one embodiment, determines information of the user interaction by translating the initialization user input event and/or the interaction user input event into a format that the target software application shell supports.

In one embodiment, the interaction communication module communicates the information of the user interaction to the target software application shell. The interaction communication module, in a further embodiment, communicates the information of the user interaction using a communications channel supported by the target user interface.

The user interaction between the source software application shell and the target software application shell, in one embodiment, includes a drag-and-drop user interaction. In a further embodiment, the initial user input event includes dragging an item from the source software application shell. In another embodiment, the interaction user input event includes dropping the item over the target software application shell. In one embodiment, the invisible software application shell intercepts the interaction user input event.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
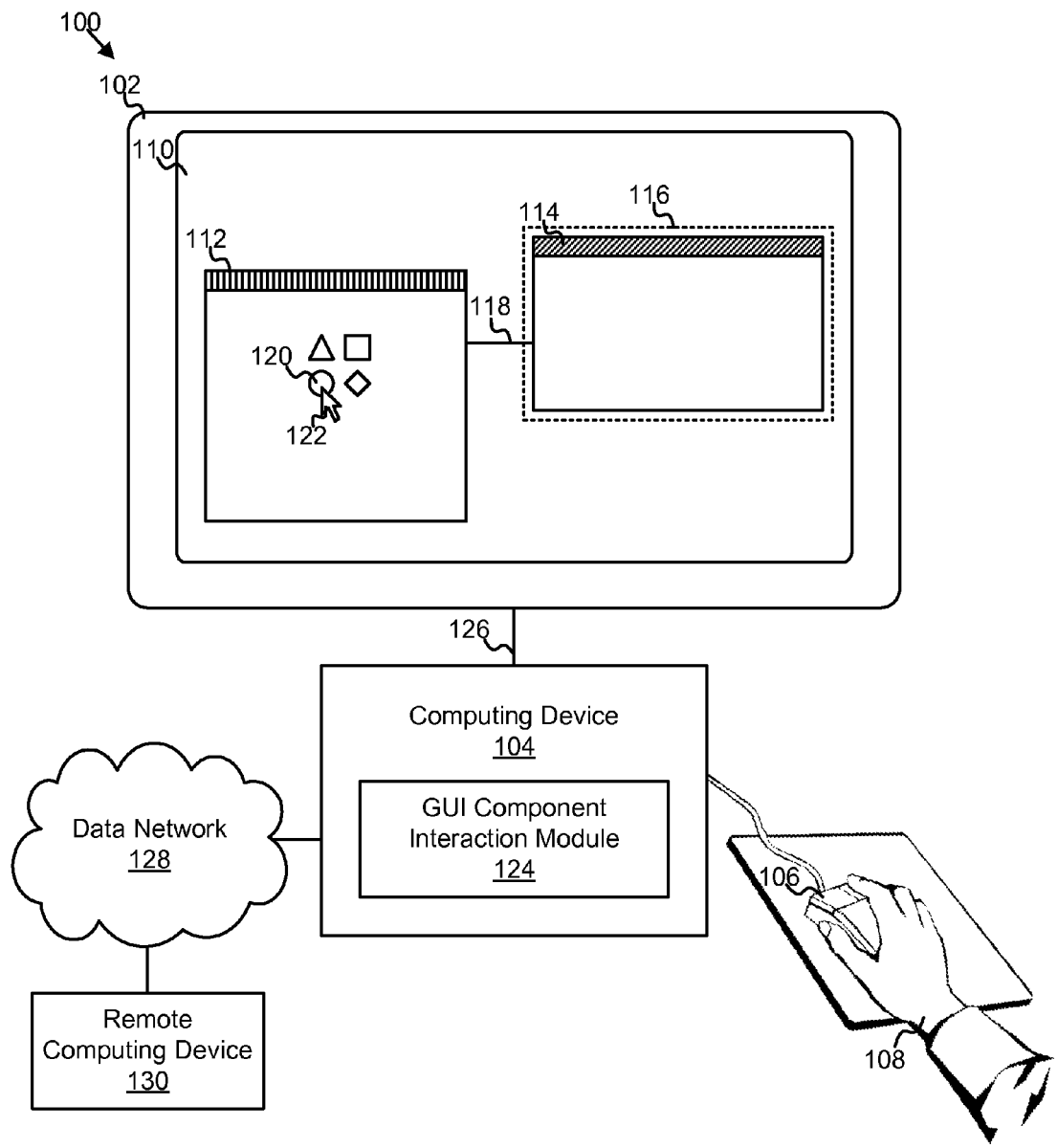
FIG. 1 is a schematic block diagram illustrating one embodiment of a system for enabling user interactions between user interface components in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 for enabling user interactions between user interface components 112, 114. In the depicted embodiment, the system includes a display device 102 that visually displays a graphical user interface ("GUI") 110 to a user 108. A computing device 104, in the depicted embodiment, provides the GUI 110 to the display device 102. In the depicted embodiment, the computing device 104 includes a GUI component interaction module 124. The computing device 104, in the depicted embodiment, receives input from the user 108 through a user input device 106 and is in communication with a remote computing device 130 over a data network 128.

The system 100, in one embodiment, enables the user 108 to interact between a source user interface component 112 displayed in the GUI 110 and a target user interface component 114, even if the source user interface component 112 and the target user interface component 114 occupy different event domains. An event domain, in one embodiment, is a subset of the GUI 110 that receives user input events that are inaccessible to other event domains of the GUI 110.

In one embodiment, the system 100 places a transparent user interface component 116 over the target user interface component 114 to intercept user input to the target user interface component 114. The transparent user interface component 116, in one embodiment, is in the same event domain as the source user interface component 112, so that the transparent user interface component 116 intercepts a user interaction between the source user interface component 112 and the target user interface component 114. The system 100, in one embodiment, communicates the user interaction to the target user interface component 114 over a communications channel 118 that the target user interface component 114 supports. In one embodiment, the transparent user interface component 116 is invisible and the user interaction interception by the transparent user interface component 116 is undetectable by the user 108.

In the depicted embodiment, the display device 102 visually displays the GUI 110 to the user 108. The display device 102, in one embodiment, is an electronic display, such as a liquid crystal display ("LCD"), an inorganic or organic light emitting diode ("LED") display, a cathode ray tube ("CRT") display, a plasma display, a projector, a field emission display ("FED"), a surface conduction electron emitter display ("SED"), an electronic paper display, a laser display, and/or another type of electronic display.

In the depicted embodiment, the display device 102 is in communication with the computing device 104 over a display connection 126. The computing device 104, in one embodiment, provides the display device 102 with an image signal using the display connection 126. The image signal, in one embodiment, is an analog or digital electric signal representing the GUI 110. In various embodiments, the display connection 126 may include a video graphics array ("VGA") connection, a digital visual interface ("DVI") connection, a high-definition multimedia interface ("HDMI") connection, a DisplayPort connection, a low-voltage differential signaling ("LVDS") connection, a universal serial bus ("USB") connection, an IEEE 1394 ("FireWire") connection, a direct wire connection, a proprietary connection, or another type of display connection.

In one embodiment, the computing device 104 includes one or more computing components, such as a processor, one or more computer readable mediums, a graphics adapter for driving the display device 102, a wired and/or wireless network interface card for communications over the data network 128, one or more user input devices 106, and/or other computing components. In one embodiment, the display device 102 is integrated with the computing device 104. The computing device 104, in various embodiments, may be embodied by a desktop computer, a laptop computer, a server computer, a thin client computer, a tablet computer, a mobile telephone, a mobile entertainment device, an e-book reader, and/or another computing device.

In the depicted embodiment, the computing device 104 includes a user input device 106. The user input device 106, in the depicted embodiment, is illustrated as a computer mouse. In other embodiments, the user input device 106 may include a computer keyboard, a touchpad, a touchscreen, a joystick, a pointing stick, a trackball, an accelerometer-based user input device, a gyroscope-based user input device, an optical user input device, one or more buttons, one or more switches, one or more knobs, one or more rockers, and/or other types of user input devices allowing the user 108 to provide user input to the computing device 104.

In one embodiment, the computing device 104 includes an operating system, firmware, software, hardware, or the like that provides the GUI 110. The GUI 110, in one embodiment, includes a visual representation displayed on a screen of the display device 102 and a logical framework that provides software application integration with the GUI 110. The logical framework of the GUI 110, in one embodiment, allows software applications to place user interface components in the visual representation of the GUI 110 on the screen of the display device 102 and to receive user input events associated with the user interface components. The GUI 110, in one embodiment, includes or is part of a desktop environment, a window manager, and/or another graphical environment.

A user interface component, in one embodiment, may include an item for display in the GUI 110, such as a shell, a window, a menu, a dialogue box, a widget, an icon, an image, a video, and/or another object displayable in the GUI 110. A software application shell, in one embodiment, includes a region of the GUI 110 that receives user input events. In one embodiment, a software application shell includes an outer layer or top level interface between the user 108 and an associated software application.

A user interface component, in a further embodiment, may include an item that is logically associated with the GUI 110, but the GUI 110 may not visibly display the component to the user 108, or the GUI 110 may display a portion of the component. For example, in various embodiments, a user interface component may be partially or completely transparent, may be covered by another user interface component, may be logically disposed off of an edge of the screen of the display device 102, may be a part of the framework of the GUI 110 without being displayed by the GUI 110, and/or may be otherwise associated with the GUI 110 without being fully displayed by the GUI 110. In a further embodiment, a user interface component may include one or more other user interface components as subcomponents visually displayed or otherwise embedded within the user interface component.

A user input event, in one embodiment, is a predefined user interaction with a user interface component. In one embodiment, the GUI 110 detects user input events. User input events, in various embodiments, may include selection of a user interface component or subcomponent, clicking a button, releasing a button, pressing a key, releasing a key, moving or otherwise manipulating a user input device 106, a predefined user movement, and/or another predefined user interaction. A user input event, in one embodiment, includes a sequence of predefined user interactions or separate user input events. A user input event, in a further embodiment, may be defined relative to a specific user interface component or type of user interface component, such as dragging an icon or scrollbar, pressing a button, selecting a menu item, or the like.

In the depicted embodiment, the GUI 110 includes a pointer 122. The pointer 122, in one embodiment, visually represents input from the user 108. In a further embodiment, the GUI 110 moves the pointer 122 in response to the user 108 manipulating the user input device 106. The pointer 122, in one embodiment, facilitates interaction between the user 108 and user interface components in the GUI 110. The pointer 122, in one embodiment, includes a visual representation in the GUI 110, such as an arrow, a hand, an hourglass, a cursor, an I-beam, or the like indicating a position of the pointer 122 in the GUI 110. In a further embodiment, a position of the pointer 122 may be indicated by a position that the user 108 touches, on a touchscreen or another touch sensitive user input device 106, with or without a visual representation of the pointer 122.

In one embodiment, a user input event may be defined relative to the pointer 122. A user input event, in various embodiments, may be defined relative to a position or location of the pointer 122 in the GUI 110, a predefined movement or gesture of the pointer 122, pressing and/or releasing a button during a predefined movement of the pointer 122, and/or other user input events relative the pointer 122.

In the depicted embodiment, the GUI 110 includes a source user interface component 112 and a target user interface component 114. In one embodiment, the source user interface component 112 and the target user interface component 114 each include a software application shell that the GUI 110 visibly displays. The source user interface component 112 and the target user interface component 114, in the depicted embodiment, each include a software application window visible in the GUI 110. In a further embodiment, the target user interface component 114 may be displayed within the source user interface component 112, or vice versa. For example, in one embodiment, the target user interface component 114 may include a shell from one software application that is embedded in the source user interface component 112 from another software application, such as a software application with an embedded web browser, or the like. In a further embodiment, the source user interface component 112 and the target user interface component 114 each include a separate shell from the same software application.

The source user interface component 112 and the target user interface component 114, in one embodiment, each occupy a separate event domain. As described above, in one embodiment, an event domain is a subset of the GUI 110 that receives user input events that are inaccessible to other event domains of the GUI 110. Because the source user interface component 112 and the target user interface component 114 occupy separate event domains, in one embodiment, user input to one of the source user interface component 112 and the target user interface component 114 is not directly accessible or available to the other user interface component.

The source user interface component 112 and the target user interface component 114 may occupy separate event domains for various reasons. In one embodiment, the source user interface component 112 and the target user interface component 114 may be shells from different software applications running on the computing device 104 that do not communicate with each other or communicate in a limited manner. In another embodiment, the source user interface component 112 and the target user interface component 114 may be shells from a single software application in separate event domains, such as shells using different interfaces or versions of the GUI 110, a graphical shell of the GUI 110 and a command line interface ("CLI") shell of the GUI 110, shells that support different levels of user interaction, or the like.

In a further embodiment, the source user interface component 112 and the target user interface component 114 may be from software applications running in different environments. For example, in one embodiment, the source user interface component 112 may be associated with the computing device 104 and the target user interface component 114 may be associated with a remote connection to the remote computing device 130 over the data network 128, or vice versa. In another embodiment, the source interface component 112 may be associated with a host operating system of the computing device 104 and the target interface component 114 may be associated with a virtual operating system running on the computing device 104, the source user interface component 112 and the target user interface component 114 may each be associated with different virtual operating systems on the computing device 104, or the like.

In one embodiment, at least one of the source user interface component 112 and the target user interface component 114 is associated with a remote computing device 130. For example, one or both of the source user interface component 112 and the target user interface component 114 include a software application shell associated with a remote desktop connection, a secure shell ("SSH") connection, an application sharing connection, a screen sharing connection, a virtual network computing ("VNC") connection, a telnet connection, and/or another remote connection with a remote computing device 130 over the data network 128. The source user interface component 112 and the target user interface component 114, in one embodiment, occupy separate event domains because they are associated with different computing devices, such as the computing device 104 and the remote computing device 130, two remote computing devices 130, or the like.

In the depicted embodiment, the source user interface component 112 includes one or more items 120. The one or more items 120, in one embodiment, each include a user interface subcomponent, such as an icon, a menu item, a check box, a dropdown menu, a radio button, a selection palette, text, a hyperlink, an image, a text input box, a widget, a button, a tab, and/or another user interface component. In one embodiment, the GUI 110 allows the user 108 to interact with the one or more items 120 using the user input device 106, or the like. An item 120, in one embodiment, may be associated with a data structure, a file, a program, a format, a characteristic, or the like. For example, an icon may visually represent a file or an application, a selection palette or a menu may include several colors, patterns, formatting options, or the like for selection by the user 108, a dropdown menu may include options associated with a data structure, or the like.

In the depicted embodiment, the target user interface component 114 provides a communications channel 118 which the GUI component interaction module 124, the source user interface component 112, or the like may use to communicate information to the target user interface component 114. The communications channel 118, in one embodiment, is supported by the target user interface component 114 and known to the GUI component interaction module 124 and/or the source user interface component 112. Examples of the communications channel 118, in various embodiments, include an application programming interface ("API") of the target user interface component 114, a supported communications format, a supported command format, a supported file format, a supported protocol, a supported language, or the like. In one embodiment, the target user interface component 114 includes a web application that provides an external interface API, or the like, that the GUI component interaction module 124 and/or the source user interface component 112 may access using hyper text transfer protocol ("HTTP"), JavaScript, another API call, or the like.

In the depicted embodiment, the computing device 104 includes the GUI component interaction module 124. Additional embodiments of the GUI component interaction module 124 are described in greater detail with regard to FIGS. 2 and 3. In one embodiment, the GUI component interaction module 124 enables user interactions between the source user interface component 112 and the target user interface component 114. The GUI component interaction module 124, in one embodiment, is part of a software application associated with the source user interface component 112. In a further embodiment, the GUI component interaction module 124 is part of the software framework of the GUI 110.

In the depicted embodiment, the GUI component interaction module 124 enables user interactions between the source user interface component 112 and the target user interface component 114 by placing a transparent user interface component 116 over the target user interface component 114 to intercept one or more user interactions. In one embodiment, the transparent user interface component 116 occupies the same event domain as the source user interface component 112. The GUI component interaction module 124, in one embodiment, places the transparent user interface component 116 over the target user interface component 114 at a beginning of a user interaction and removes the transparent user interface component 116 at an end of the user interaction. The transparent user interface component 116, in one embodiment, is a shell of a software application associated with the source user interface component 116.

In one embodiment, the transparent user interface component 116 is partially or fully transparent in the GUI 110 so that the target user interface component 114 is visible in the GUI 110 beneath the transparent user interface component 116. In a further embodiment, the transparent user interface component 116 is invisible in the GUI 110 and substantially imperceptible to the user 108 in the GUI 110. The GUI component interaction module 124, in one embodiment, communicates information of the intercepted user interaction to the target user interface component 114 using the communications channel 118.

The target user interface component 114, in one embodiment, does not directly support the user interaction with the source user interface component 112 without the GUI component interaction module 124 and the transparent user interface component 116. In a further embodiment, the target user interface component 114 does not directly support the user interaction because the source user interface component 112 and the target user interface component 114 occupy separate event domains.

One example embodiment of a user interaction between the source user interface component 112 and the target user interface component 114 is a drag-and-drop user interaction where the user 108 drags an item 120 from the source user interface component 112 and drops the item 120 over the target user interface component 114. In one embodiment, the GUI component interaction module 124 places the transparent user interface component 116 over the target user interface component 114 toward a beginning of the drag-and-drop user interaction, intercepts the "drop" of the item 120 over the target user interface component 114, and communicates information of the drag-and-drop user interaction to the target user interface component 114 using the communications channel 118. In a further embodiment, the GUI component interaction module 124 removes the transparent user interface component 116 from the GUI 110 toward an end of the drag-and-drop user interaction.

Figure 2:
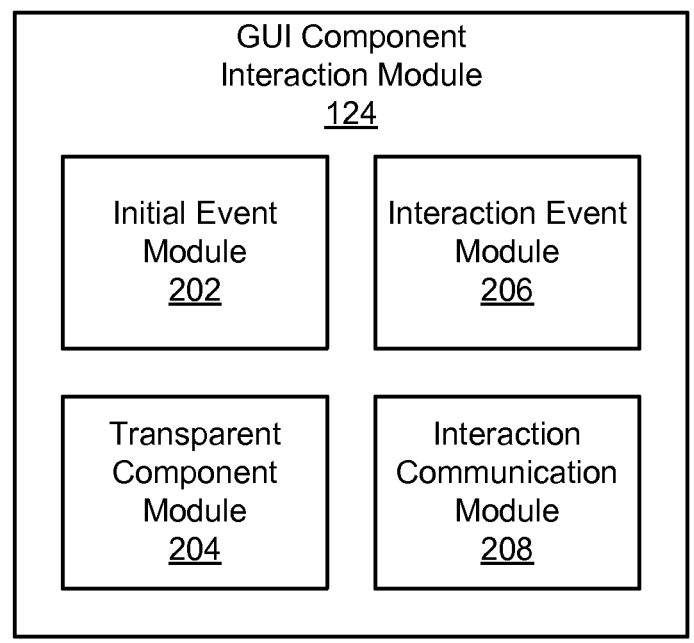
FIG. 2 is a schematic block diagram illustrating one embodiment of a GUI component interaction module in accordance with the present invention.

FIG. 2 depicts one embodiment of the GUI component interaction module 124. In the depicted embodiment, the GUI component interaction module 124 includes an initial event module 202, a transparent component module 204, an interaction event module 206, and an interaction communication module 208. The GUI component interaction module 124, in one embodiment, is substantially similar to the GUI component interaction module 124 described above with regard to FIG. 1.

In one embodiment, the initial event module 202 detects an initial user input event to the GUI 110. The initial user input event, in one embodiment, is associated with a user interaction between the source user interface component 112 and the target user interface component 114. In a further embodiment, the initial user input event is associated with a beginning or initial input of a user interaction. The initial user input event, in one embodiment, includes a user input to the source user interface component 112, such as a selection, manipulation, or another user input to an item 120 of the source user interface component 112.

The initial event module 202, in one embodiment, detects several different types of initial user input events. In a further embodiment, different initial user input events may be associated with different user interactions. In one embodiment, the initial event module 202 determines with which user interaction a detected initial user input event is associated. In a further embodiment, a single user input event may be associated with several different user interactions and the initial event module 202 may not initially determine with which user interaction a detected initial user input event is associated.

In one embodiment, one type of initial user input event includes the user 108 dragging an item 120 from the source user interface component 112 using the user input device 106, as part of a drag-and-drop user interaction or the like. In a further embodiment, an initial user input event includes a specific type of dragging, such as dragging an item 120 over an edge of the source user interface component 112, dragging a predefined item 120 or type of item 120, dragging an item 120 in a predefined direction, dragging an item 120 from the source user interface component 112 over an edge of the target user interface component 114, dragging an item 120 from the source user interface component 112 toward the target user interface component 114, and/or another predefined dragging user input event.

In a further embodiment, one type of initial user input event includes a user selection of an option from an item 120 of the source user interface component 112, such as a user selection of an element from a palette, or the like. The user selection, in one embodiment, is for use in the target user interface component 114. In light of this disclosure, one of skill in the art will recognize other types of initial user input events that the initial event module 202 may detect.

In one embodiment, the transparent component module 204 places the transparent user interface component 116 over the target user interface component 114. The transparent component module 204, in a further embodiment, places the transparent user interface component 116 in response to the initial event module 202 detecting an initial user input event. In one embodiment, the transparent component module 204 places the transparent user interface component 116 logically above the target user interface component 114 in the GUI 110.

By placing the transparent user interface component 116 over the target user interface component 114, in one embodiment, the transparent user interface component 116 intercepts user input to the target user interface component 114. The transparent user interface component 116, in a further embodiment, intercepts user input substantially imperceptibly, so that it appears to the user 108 that the target user interface component 114 receives the user input. In one embodiment, the transparent user interface component 116 is invisible in the GUI 110 so that the target user interface component 114 is visible beneath it.

The transparent user interface component 116, in one embodiment, is sized to be at least as large as the target user interface component 114, to cover the target user interface component 114. In a further embodiment, the transparent user interface component 116 is sized to be at least as large as a predefined subcomponent of the target user interface component 114 that is associated with a user interaction. For example, the transparent user interface component 116 may be sized to cover a predefined item 120 of the target user interface component, such as a text box, a menu, an image, or the like. In another embodiment, the transparent user interface component 116 is sized to cover the entire GUI 110 so that the transparent user interface component 116 intercepts substantially all user input to the GUI 110.

In one embodiment, the interaction event module 206 detects an interaction user input event to the transparent user interface component 116. An interaction user input event, in one embodiment, continues a user interaction between the source user interface component 112 and the target user interface component 114. In a further embodiment, an interaction user input event occurs toward an end of a user interaction. An interaction user input event, in another embodiment, marks a completion of a user interaction by the user 108. For example, one embodiment of an interaction user input event includes the user 108 dropping an item 120 over the target user interface component 114. In another embodiment, where a user interaction is associated with selection of an item 120 from the source user interface component 112, an interaction user input event may include a selection of a use for the item 120 in the target user interface component 114.

The transparent user interface component 116, in one embodiment, intercepts the interaction user input event. The interaction event module 206, in one embodiment, uses the transparent user interface component 116 to detect an interaction user input event. In a further embodiment, the interaction event module 206 also detects a location of the interaction user input event in the GUI 110. The interaction event module 206, in various embodiments, may detect the location of the interaction user input event as a location of the pointer 122, a location of an item 120 associated with the interaction user input event, or the like. The location of the interaction user input event, in one embodiment, includes coordinates of the user input event in the GUI 110.

In another embodiment, the interaction event module 206 detects the location of the interaction user input event relative to the transparent user interface component 116 and/or the target user interface component 114. For example, in various embodiments, the interaction event module 206 may detect the location as a location, coordinate, or the like within a user interface component; as a region, quadrant, sector, or the like of a user interface component; as an item 120 associated with an interaction user input event within a user interface component; and/or another location relative to the transparent user interface component 116 or the target user interface component 114. The interaction event module 206, in one embodiment, receives a location of an interaction user input event from the GUI 110, using a framework of the GUI 110, or the like.

In a further embodiment, the interaction event module 206 captures, receives, and/or determines information associated with the interaction user input event. Information associated with the interaction user input event, in various embodiments, may include text input from the user 120, an item 120 of the target user interface component 114 associated with the interaction user input event, a gesture associated with the interaction user input event, a selection by the user 108 associated with the interaction user input event, and/or other information associated with the interaction user input event.

In one embodiment, the interaction communication module 208 communicates information of a user interaction to the target user interface component 114 using the communications channel 118. Information of a user interaction, in one embodiment, is based on the initial user input event and/or the interaction user input event. In a further embodiment, information of a user interaction may include a command corresponding to the user interaction. In another embodiment, information of a user interaction may include one or more locations, items 120, and/or other parameters associated with the user interaction. In one embodiment, information of a user interaction includes a location of an interaction user input event that the interaction event module 206 determines. The information of a user interaction, in an additional embodiment, includes an item 120, a selection, an element, or the like of the source user interface component 112 associated with the user interaction. In one embodiment, the information of a user interaction allows the target user interface component 114 to fulfill the user interaction.

The interaction communication module 208, in one embodiment, communicates information of a user interaction using an API call to the target user interface component 114, a supported communications format of the target user interface component 114, a supported command format of the target user interface component 114, a supported file format of the target user interface component 114, a supported protocol of the target user interface component 114, a supported language of the target user interface component 114, or another supported communications channel 118 of the target user interface component 114.

Figure 3:
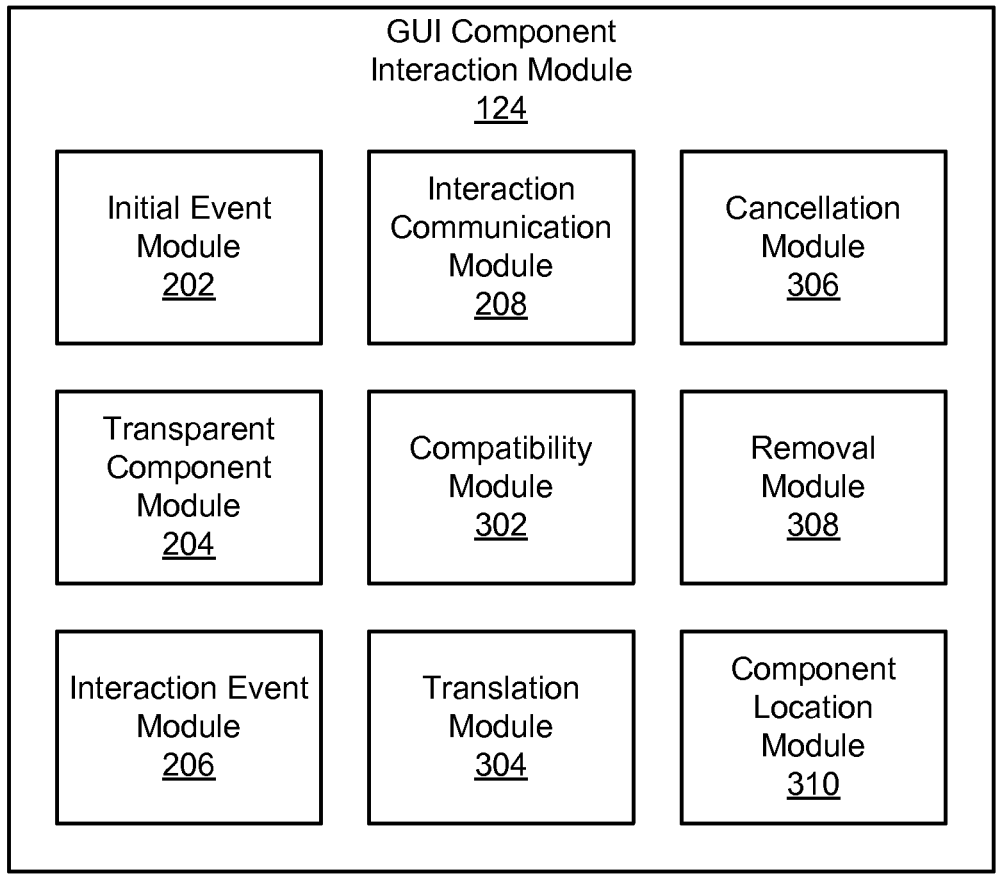
FIG. 3 is a schematic block diagram illustrating another embodiment of a GUI component interaction module in accordance with the present invention.

FIG. 3 depicts another embodiment of the GUI component interaction module 124. In the depicted embodiment the GUI component interaction module 124 includes the initial event module 202, the transparent component module 204, the interaction event module 206, and the interaction communication module 208 and further includes a compatibility module 302, a translation module 304, a cancellation module 306, a removal module 308, and a component location module 310. The GUI component interaction module 124, in one embodiment, is substantially similar to the GUI component interaction module 124 described above with regard to FIG. 1 and FIG. 2.

In one embodiment, the compatibility module 302 determines that a user interaction is suitable for communicating to the target user interface component 114 using the communications channel 118. The compatibility module 302, in one embodiment, determines that a known communications channel 118 exists between the source user interface component 112 and the target user interface component 114. In a further embodiment, the compatibility module 302 determines that the target user interface component 114 is of a type that the interaction communication module 208 supports. In another embodiment, the compatibility module 302 determines that the target user interface component 114 supports the user interaction over the communications channel 118.

The compatibility module 302, in one embodiment, matches the target user interface component 114 to a set of supported user interface components, software applications, or the like. In a further embodiment, the compatibility module 302 matches a user interaction to a set of supported user interactions. The set of supported user interactions, in one embodiment, is specific to the type of target user interface component 114. The compatibility module 302, in one embodiment, may determine a type of the target user interface component 114, a type of the user interaction, or the like based on the initial user input event and/or on the interaction user input event.

In one embodiment, the translation module 304 determines information of the user interaction for the interaction communication module 208. The translation module 304, in a further embodiment, determines the information of the user interaction by translating the initialization user input event and/or the interaction user input event into a format supported by the target user interface component 114. The information of the user interaction, in one embodiment, includes a command that the translation module 304 selects, populates, and/or formats. In one embodiment, the translation module 304 selects a command corresponding to a user interaction based on the initial user input event and/or the interaction user input event. For example, the translation module 304, in one embodiment, may translate a drag-and-drop user interaction (i.e. a dragging initial user input event and a dropping interaction user input event, or the like) into a command or another communication providing a dragged item 120 to the target user interface component 114. In another example, the translation module 304 translates a drag-and-drop user interaction into a "create note" command, or the like, for the target user interface component 114.

In one embodiment, the cancellation module 306 detects a cancellation event indicating that the user 108 has aborted a user interaction between the source user interface component 112 and the target user interface component 114. The cancellation module 306, in a further embodiment, removes the transparent user interface component 116 from the target user interface component 114 in response to detecting the cancellation event. A cancellation event, in various embodiments, may include the user 108 exceeding a predefined timeout period between an initial user input event and an interaction user input event, the user 108 pressing and/or releasing a predefined button or key (such as the escape key or the like), a user interaction with a user interface component other than the target user interface component 114, the user 108 moving the pointer 122 outside of the target user interface component 114, or the like.

In one embodiment, the removal module 308 removes the transparent user interface component 116 from the target user interface component 114 in response to the interaction user input event. By removing the transparent user interface component 116 from over the target user interface component 114 in the GUI 110, in one embodiment, the removal module 308 allows the user 108 to interact directly with the target user interface component 114, without the transparent user interface component 116 intercepting user input events.

In one embodiment, the component location module 310 determines a location in the GUI 110 for the transparent component module 204 to place the transparent user interface component 116. The component location module 310, in one embodiment, determines the location for the transparent user interface component 116 based on a location of the target user interface component 114. The component location module 310, in one embodiment, may determine the location of the target user interface component 114 based on a location at which the source user interface component 112 placed the target user interface component 114 or another known location for the target user interface component 114. In another embodiment, the component location module 310 may determine the location of the target user interface component 114 based on information from the GUI 110, an operating system associated with the GUI 110, user input, or the like.

Figure 4:
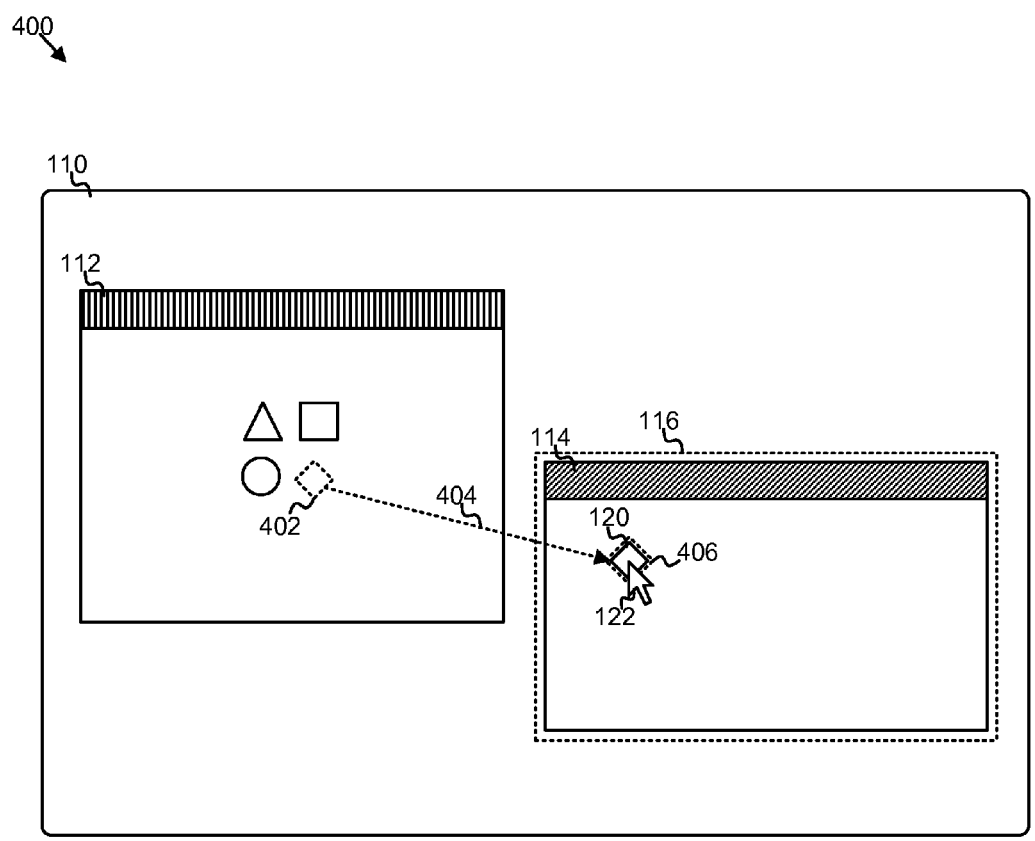
FIG. 4 is a schematic block diagram illustrating one embodiment of a drag-and-drop user interaction in accordance with the present invention.

FIG. 4 depicts one embodiment of a drag-and-drop user interaction 400. In the depicted embodiment, the user 108 selects an item 120 from a source location 402 of the source user interface component 112. The user 108, in the depicted embodiment, drags the item 120 from the source location 402 along a dragging path 404 to a target location 406 over the target user interface component 114 where the user 108 drops the item 120.

In one embodiment, the initial event module 202 detects the user 108 dragging the item 120 from the source location 402 as an initial user input event. The initial event module 202, in various embodiments, may detect initial dragging of the item 120 as an initial user input event, may detect dragging the item 120 over an edge of the source user interface component 112 as an initial user input event, may detect dragging the item 120 over an edge of the target user interface component 112 as an initial user input event, or may detect another indication that the user 108 is performing a user interaction between the source user interface component 112 and the target user interface component 114 as an initial user input event.

In the depicted embodiment, the transparent component module 204 places the transparent user interface component 116 over the target user interface component 114 in the GUI 110. The transparent component module 204, in one embodiment, places the transparent user interface component 116 in response to the initial event module 202 detecting an initial user input event. The transparent user interface component 116, in one embodiment, intercepts the user dropping the item 120 over the target user interface component 114 at the target location 406.

The interaction event module 206, in one embodiment, detects the user dropping the item 120 over the target user interface component 114 as an interaction user input event. In a further embodiment, the interaction event module 206 additionally detects the target location 406 at which the user 108 drops the item 120. The interaction communication module 208, in one embodiment, communicates information of the user interaction to the target user interface component 114. Information of the drag-and-drop user interaction, in various embodiments, may include a drag-and-drop command, the target location 406, the item 120, information of the item 120, and/or other information of the drag-and-drop user interaction.

Figure 5:
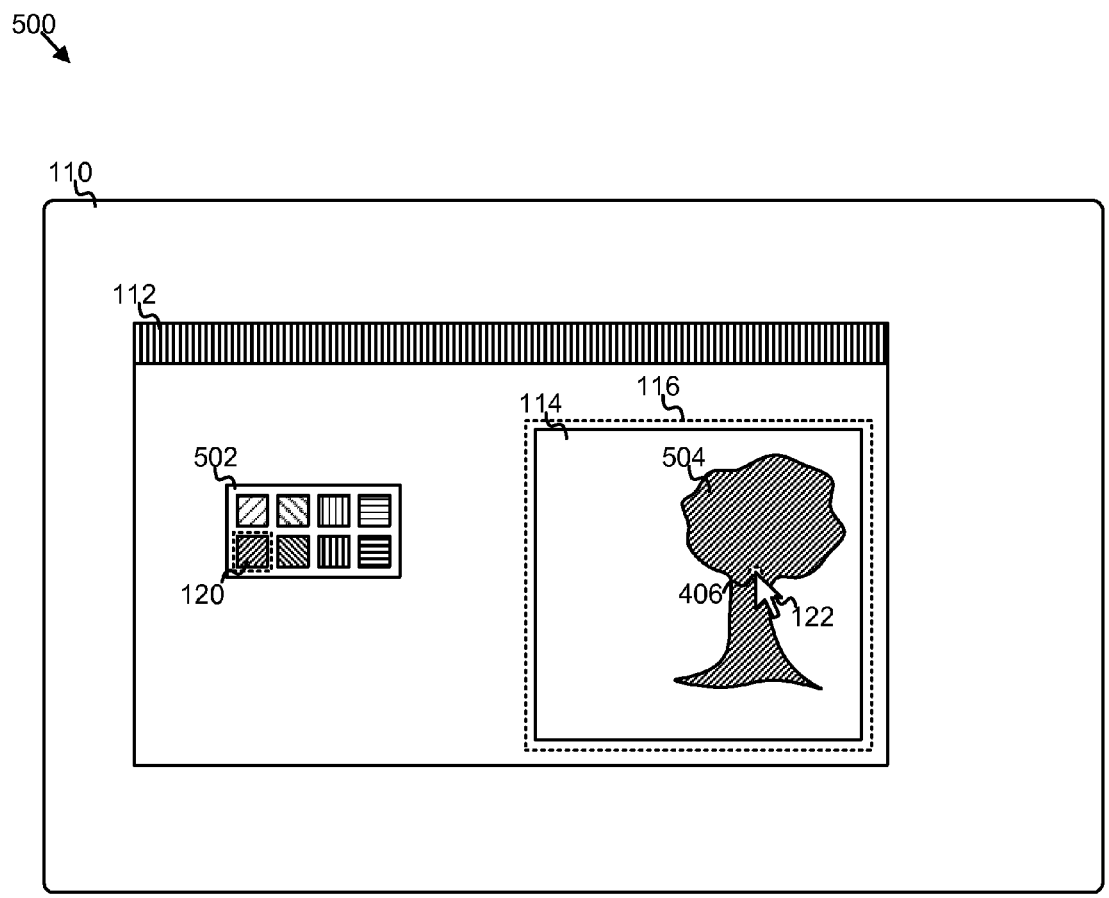
FIG. 5 is a schematic block diagram illustrating one embodiment of a palette selection user interaction in accordance with the present invention.

FIG. 5 depicts one embodiment of a palette selection user interaction 500. In the depicted embodiment, the target user interface component 114 is displayed within the source user interface component 112, as an embedded subcomponent, or the like. The user 108, in the depicted embodiment, selects an item 120 from a palette 502 of the source user interface component 112 for use in the target user interface component 114. Each item 120 of the palette 502, in the depicted embodiment, includes a graphical pattern. Other embodiments of items 120 from a palette 502 may include colors, text formats, graphics formats, menu options, and/or other palette items.

In the depicted embodiment, the user 108 selects a target item 504 in the target user interface component 114 for use of the selected item 120. The target item 504, in the depicted embodiment, is illustrated as a tree type shape which the user 108 selected for use of the pattern from the selected item 120 of the source user interface component 112. The target user interface component 114, in one embodiment, uses the selected item 120 for the target item 504. In the depicted embodiment, the target user interface component 114 fills the target item 504 with the graphical pattern of the selected item 120.

In one embodiment, the initial event module 202 detects the user 108 selecting the item 120 from the palette 502 of the source user interface component 112 as an initial user input event. The transparent component module 204, in the depicted embodiment, places the transparent user interface component 116 over the target user interface component 114 in the GUI 110 in response to the initial event module 202 detecting an initial user input event. The transparent user interface component 116, in a further embodiment, intercepts the user's selection of the target item 504 over the target user interface component 114.

The interaction event module 206, in one embodiment, detects the user's selection of a use for the selected item 120 (i.e. selecting the target item 504) over the target user interface component 114 as an interaction user input event. In a further embodiment, the interaction event module 206 additionally detects a target location 406 at which the user 108 selects the target item 504. The interaction communication module 208, in one embodiment, communicates information of the user interaction to the target user interface component 114. Information of the palette selection user interaction, in various embodiments, may include a palette selection command, the target location 406, the selected item 120 from the palette 502, information of the selected item 120, and/or other information of the palette selection user interaction.

Figure 6:
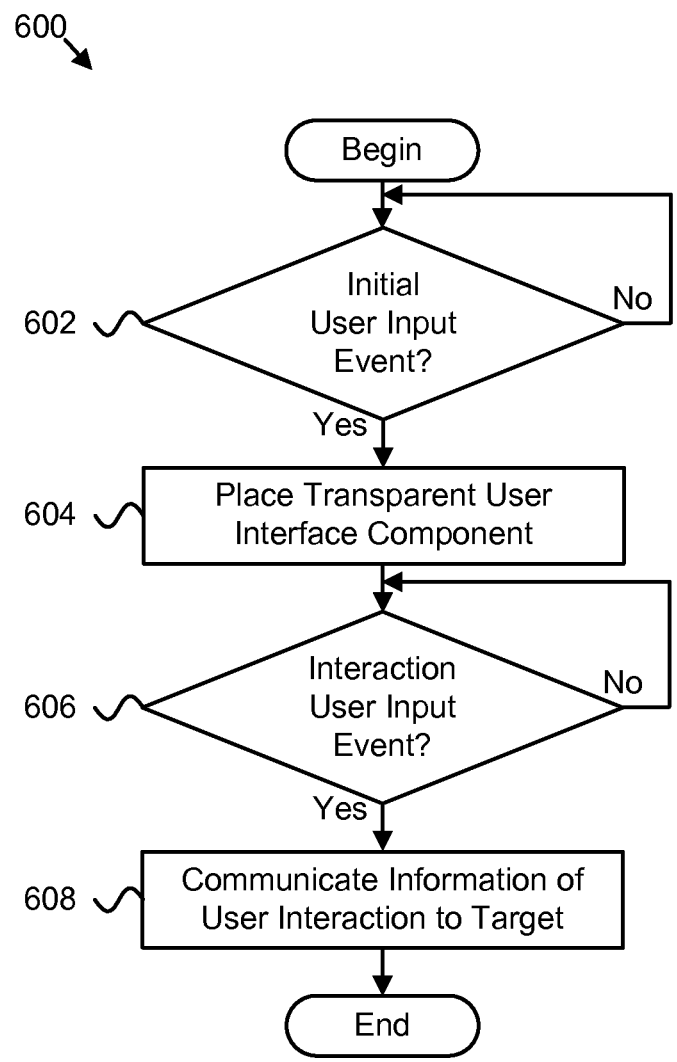
FIG. 6 is a schematic flow chart diagram illustrating one embodiment of a method for enabling user interactions between user interface components in accordance with the present invention.

FIG. 6 depicts one embodiment of a method 600 for enabling user interactions between user interface components 112, 114. In the depicted embodiment, the method 600 begins and the initial event module 202 determines 602 whether the GUI 110 and/or the source user interface component 112 have received an initial user input event associated with a user interaction between the source user input component 112 and the target user input component 114. For example, in various embodiments, the initial event module 202 may determine 602 whether the GUI 110 and/or the source user input component 112 have received an initial user input event by detecting the user 108 dragging an item 120, selecting an item 120, or the like.

If the initial event module 202 determines 602 that the GUI 110 and/or the source user interface component 112 have not received an initial user input event from the user 108, in the depicted embodiment, the initial event module 202 waits at the determining step 602, monitoring the GUI 110 and/or the source user interface component 112 for an initial user input event. If the initial event module 202 determines 602 that the GUI 110 and/or the source user interface component 112 have received an initial user input event from the user 108, in the depicted embodiment, the transparent component module 204 places 604 the transparent user interface component 116 over the target user interface component 114.

The interaction event module 206, in the depicted embodiment, determines 606 whether the transparent user interface component 116 has received an interaction user input event that continues the user interaction between the source user input component 112 and the target user interface component 114. For example, in various embodiments, the interaction event module 206 may determine 606 whether the transparent user interface component 116 has received an interaction user input event by detecting the user 108 dropping an item 120 over the target user interface component 114, detecting the user 108 selecting a use for an item 120 in the target user interface component 114, or the like.

If the interaction event module 206 determines 606 that the transparent user interface component 116 has not received an interaction user input event, in the depicted embodiment, the interaction event module 206 waits at the determining step 606, monitoring the transparent user interface component 116 for an interaction user input event. If the interaction event module 206, in the depicted embodiment, determines 606 that the transparent user interface component 116 has received an interaction user input event, the interaction communication module 208 communicates 608 information of the user interaction to the target user interface component 114 using the communications channel 118 and the method 600 ends.

Figure 7:
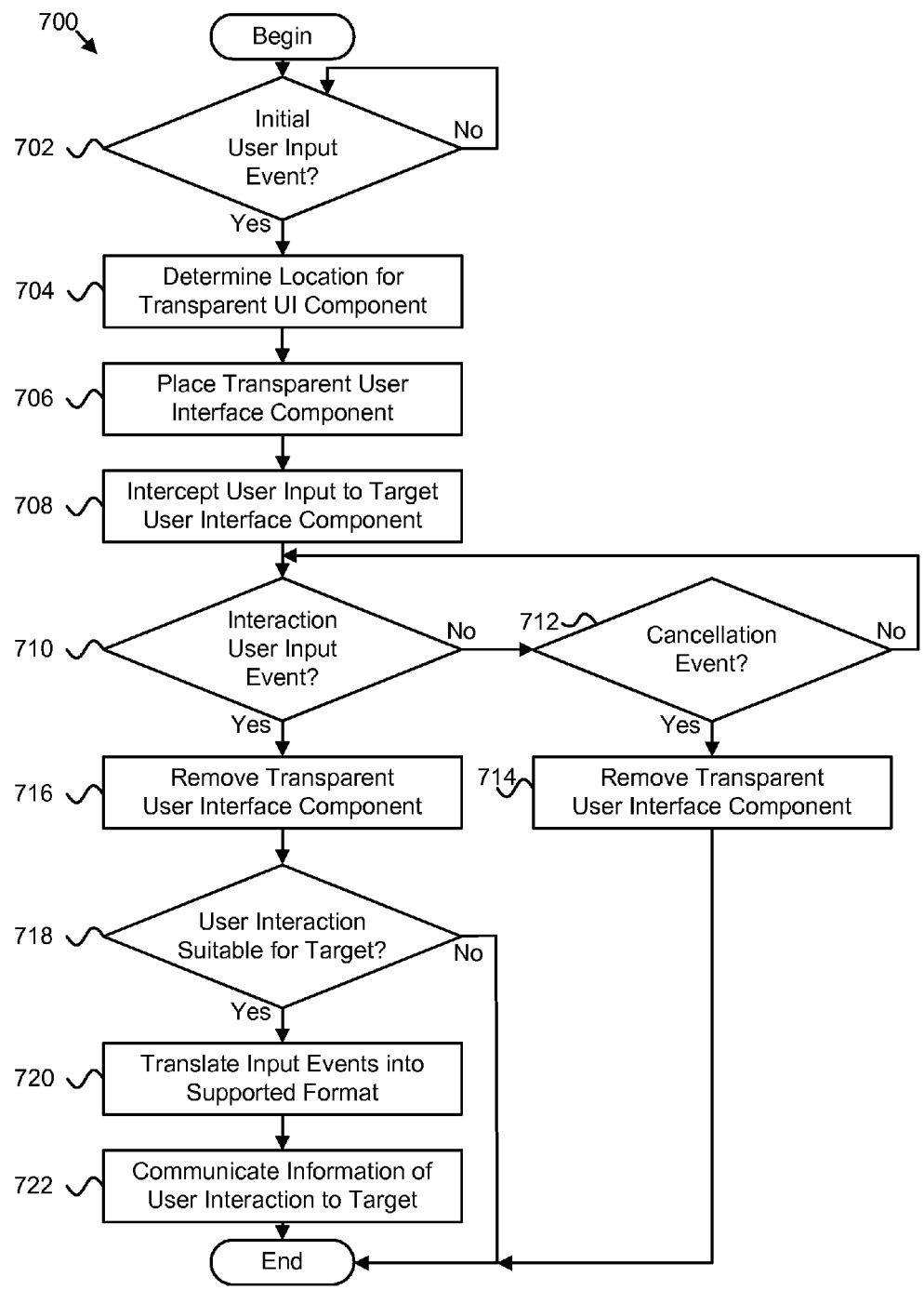
FIG. 7 is a schematic flow chart diagram illustrating another embodiment of a method for enabling user interactions between user interface components in accordance with the present invention.

FIG. 7 depicts another embodiment of a method 700 for enabling user interactions between user interface components 112, 114. In the depicted embodiment, the method 700 begins and the initial event module 202 determines 702 whether the GUI 110 and/or the source user interface component 112 have received an initial user input event associated with a user interaction between the source user input component 112 and the target user input component 114.

If the initial event module 202 determines 702 that the GUI 110 and/or the source user interface component 112 have not received an initial user input event from the user 108, in the depicted embodiment, the initial event module 202 waits at the determining step 702, monitoring the GUI 110 and/or the source user interface component 112 for an initial user input event. If the initial event module 202 determines 702 that the GUI 110 and/or the source user interface component 112 have received an initial user input event from the user 108, in the depicted embodiment, the component location module 310 determines 704 a location in the GUI 110 for the transparent user interface component 116. The component location module 310, in one embodiment, determines 704 the location based on a location of the target user interface component 114. In another embodiment, a location of the target user interface component 114 is known so the component location module 310 does not determine 704 a location. The transparent component module 204, in the depicted embodiment, places 706 the transparent user interface component 116 over the target user interface component 114 and the transparent user interface component 116 intercepts 708 user input to the target user interface component 114.

The interaction event module 206, in the depicted embodiment, determines 710 whether the transparent user interface component 116 has received an interaction user input event that continues the user interaction between the source user input component 112 and the target user interface component 114. If the interaction event module 206 determines 710 that the transparent user interface component 116 has not received an interaction user input event, in the depicted embodiment, the cancellation module 306 determines 712 whether the GUI 110 has received a cancellation event indicating that the user 108 has aborted the user interaction. If the cancellation module 306 determines 712 that the GUI 110 has received a cancellation event, the cancellation module 306 removes 714 the transparent user interface component 116 from the target user interface component 114 in the GUI 110.

If the cancellation module 306 determines 712 that the GUI 110 has not received a cancellation event, the interaction event module 206 waits at the determining step 710, monitoring the transparent user interface component 116 for an interaction user input event. If the interaction event module 206, in the depicted embodiment, determines 710 that the transparent user interface component 116 has received an interaction user input event, the removal module 308 removes 716 the transparent user interface component 116 from the target user interface component 114 in the GUI 110.

The compatibility module 302, in the depicted embodiment, determines 718 whether the user interaction is suitable for communicating to the target user interface component 114 using the communications channel 118. If the compatibility module 302 determines 718 that the user interaction is not suitable for communication to the target user interface component 114, the method 700 ends. If the compatibility module 302 determines 718 that the user interaction is suitable for communication to the target user interface component 114, in the depicted embodiment, the translation module 304 translates 720 the initialization user input event and/or the interaction user input event into a format supported by the target user interface component 114 to determine information of the user interaction. The interaction communication module 208 communicates 722 information of the user interaction, as translated 720 by the translation module 304, to the target user interface component 114 using the communications channel 118 and the method 700 ends. Note that in other embodiments, the removal module 308 removes 716 the transparent user interface component 116 at a different step than indicated, such as after steps 718, 720, and 722.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to enable user interactions between user interface components, the apparatus comprising:
    an initial event module configured to detect an initial user input event to a graphical user interface ("GUI"), the initial user input event associated with a user interaction between a source user interface component displayed in the GUI and a target user interface component displayed in the GUI, the source user interface component and the target user interface component occupying separate event domains;
    a transparent component module configured to place a transparent user interface component over the target user interface component in response to the initial user input event, the transparent user interface component occupying the same event domain as the source user interface component;
    an interaction event module configured to detect an interaction user input event to the transparent user interface component, the interaction user input event continuing the user interaction between the source user interface component and the target user interface component; and
    an interaction communication module configured to communicate information of the user interaction to the target user interface component using a communications channel supported by the target user interface component,
    wherein at least a portion of the initial event module, the transparent component module, the interaction event module, and the interaction communication module comprise one or more of hardware and executable code, the computer readable program code stored on one or more computer readable non-transitory storage media.

2. The apparatus of claim 1, wherein an event domain comprises a subset of the GUI that receives user input events that are inaccessible to other event domains of the GUI.

3. The apparatus of claim 1, further comprising a translation module configured to determine the information of the user interaction by translating the initialization user input event and the interaction user input event into a format supported by the target user interface component.

4. The apparatus of claim 3, wherein the information of the user interaction comprises a command corresponding to the user interaction, wherein the translation module is further configured to select the command based on at least one of the initialization user input event and the interaction user input event.

5. The apparatus of claim 1, further comprising a removal module configured to remove the transparent user interface component from the target user interface component in response to the interaction user input event.

6. The apparatus of claim 1, further comprising a compatibility module configured to determine that the user interaction is suitable for communicating to the target user interface component using the communications channel.

7. The apparatus of claim 1, further comprising a cancellation module configured to detect a cancellation event, the cancellation event indicating that a user has aborted the user interaction between the source user interface component and the target user interface component, the cancellation module further configured to remove the transparent user interface component from the target user interface component in response to detecting the cancellation event.

8. The apparatus of claim 1, further comprising a component location module configured to determine a location in the GUI for the transparent component module to place the transparent user interface component based on a location of the target user interface component.

9. The apparatus of claim 1, wherein the transparent user interface component intercepts user input to the target user interface component, the user input comprising the interaction user input event.

10. The apparatus of claim 1, wherein the user interaction between the source user interface component and the target user interface component comprises a drag-and-drop user interaction wherein the initial user input event comprises dragging an item from the source user interface component and the interaction user input event comprises dropping the item over the target user interface component such that the transparent user interface component intercepts the interaction user input event.

11. The apparatus of claim 1, wherein the user interaction between the source user interface component and the target user interface component comprises a selection of an element from a palette of the source user interface component for use in the target user interface component, the initial user input event comprises a selection of an element from the palette of the source user interface component, and the interaction user input event comprises a selection of a use for the element in the target user interface component, wherein the transparent user interface component intercepts the selection of the use for the element.

12. The apparatus of claim 1, wherein the source user interface component and the target user interface component each comprise software application shells visible in the GUI.

13. The apparatus of claim 12, wherein the target user interface component is displayed within the source user interface component.

14. The apparatus of claim 13, wherein the target user interface component comprises a web browser displayed within the source user interface component.

15. The apparatus of claim 1, wherein the interaction event module is further configured to detect a location of the interaction user input event in the GUI and the information of the user interaction comprises the location of the interaction user input event.

16. The apparatus of claim 1, wherein the transparent user interface component is invisible in the GUI such that the target user interface component is visible in the GUI beneath the transparent user interface component.

17. A method for enabling user interactions between user interface components, the method comprising:
    detecting an initial user input event to a graphical user interface ("GUI"), the initial user input event associated with a user interaction between a source user interface component displayed in the GUI and a target user interface component displayed in the GUI, the source user interface component and the target user interface component occupying separate event domains;
    placing a transparent user interface component over the target user interface component in response to the initial user input event, the transparent user interface component occupying the same event domain as the source user interface component;
    detecting an interaction user input event to the transparent user interface component, the interaction user input event continuing the user interaction between the source user interface component and the target user interface component; and
    communicating information of the user interaction to the target user interface component using a communications channel supported by the target user interface component.

18. The method of claim 17, further comprising translating the initialization user input event and the interaction user input event into a format supported by the target user interface component to determine the information of the user interaction.

19. The method of claim 17, further comprising removing the transparent user interface component from the target user interface component in response to the interaction user input event.

20. The method of claim 17, further comprising determining that the user interaction is suitable for communicating to the target user interface component using the communications channel.

21. A computer program product comprising a computer readable non-transitory storage medium having computer readable program code executing to perform operations for enabling user interactions between user interface components, the operations of the computer program product comprising:
    detecting an initial user input event to a graphical user interface ("GUI"), the initial user input event associated with a user interaction between a source user interface component displayed in the GUI and a target user interface component displayed in the GUI, the source user interface component and the target user interface component occupying separate event domains;
    placing a transparent user interface component over the target user interface component in response to the initial user input event, the transparent user interface component occupying the same event domain as the source user interface component;
    detecting an interaction user input event to the transparent user interface component, the interaction user input event continuing the user interaction between the source user interface component and the target user interface component; and
    communicating information of the user interaction to the target user interface component using a communications channel supported by the target user interface component.

22. The computer program product of claim 21, further comprising,
    determining that the user interaction is suitable for communicating to the target user interface component using the communications channel; and
    translating the initialization user input event and the interaction user input event into a format supported by the target user interface component to determine the information of the user interaction.

23. The computer program product of claim 21, further comprising removing the transparent user interface component from the target user interface component in response to the interaction user input event.

24. The computer program product of claim 21, wherein the user interaction between the source user interface component and the target user interface component comprises a drag-and-drop user interaction wherein the initial user input event comprises dragging an item from the source user interface component and the interaction user input event comprises dropping the item over the target user interface component such that the transparent user interface component intercepts the interaction user input event.

25. An apparatus to enable user interactions between user interface components, the apparatus comprising:
- an initial event module configured to detect an initial user input event to a graphical user interface ("GUI"), the initial user input event associated with a user interaction between a source software application shell displayed in the GUI and a target software application shell displayed in the GUI, the source software application shell and the target software application shell occupying separate event domains, wherein the user interaction between the source software application shell and the target software application shell comprises a drag-and-drop user interaction and the initial user input event comprises dragging an item from the source software application shell;
- a transparent component module configured to place an invisible software application shell over the target software application shell in response to the initial user input event, the invisible software application shell occupying the same event domain as the source software application shell;
- an interaction event module configured to detect an interaction user input event to the invisible software application shell, the interaction user input event continuing the user interaction between the source software application shell and the target software application shell, wherein the interaction user input event comprises dropping the item over the target software application shell such that the invisible software application shell intercepts the interaction user input event;
- a removal module configured to remove the invisible software application shell from the target software application shell in response to the interaction user input event;
- a translation module configured to determine information of the user interaction by translating the initialization user input event and the interaction user input event into a format supported by the target software application shell; and
- an interaction communication module configured to communicate the information of the user interaction to the target software application shell using a communications channel supported by the target software application shell,
- wherein at least a portion of the initial event module, the transparent component module, the interaction event module, the removal module, the translation module and the interaction communication module comprise one or more of hardware and computer readable program code, the computer readable program code stored on one or more computer readable non-transitory storage media.

* * * * *